United States Patent
Kim et al.

(10) Patent No.: US 9,829,739 B2
(45) Date of Patent: Nov. 28, 2017

(54) DISPLAY DEVICE INCLUDING A PHOTOLUMINESCENT PANEL AND A MAGNETIC ANISOTROPY BARRIER WALL; AND METHOD OF MANUFACTURING THE DISPLAY DEVICE

(71) Applicant: Samsung Display Co., Ltd., Yongin-si (KR)

(72) Inventors: Donguk Kim, Hwaseong-si (KR); Junghyun Kwon, Seoul (KR); Youngmin Kim, Yongin-si (KR); Kisoo Park, Hwaseong-si (KR); Haeil Park, Seoul (KR); Seontae Yoon, Seoul (KR); Junhan Lee, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/171,919

(22) Filed: Jun. 2, 2016

(65) Prior Publication Data
US 2016/0357039 A1    Dec. 8, 2016

(30) Foreign Application Priority Data

Jun. 5, 2015   (KR) .................. 10-2015-0079935

(51) Int. Cl.
*G02F 1/1335*   (2006.01)

(52) U.S. Cl.
CPC .. *G02F 1/133512* (2013.01); *G02F 1/133621* (2013.01); *G02F 1/133555* (2013.01);
(Continued)

(58) Field of Classification Search
CPC ......... G02F 1/133512; G02F 1/133621; G02F 2001/133614; G02F 2001/133562; G02F 1/133555
See application file for complete search history.

(56) References Cited

U.S. PATENT DOCUMENTS 7,649,594 B2   1/2010  Kim et al.
7,750,984 B2   7/2010  Ha et al.
(Continued)

FOREIGN PATENT DOCUMENTS

KR   10-2006-0113160   11/2006
KR   10-2012-0097774    9/2012
(Continued)

OTHER PUBLICATIONS

Kim et al., "Programming magnetic anisotropy in polymeric microactuators", Nature Materials, vol. 10, pp. 747-752, Oct. 2011.
(Continued)

*Primary Examiner* — Tracie Y Green
(74) *Attorney, Agent, or Firm* — H.C. Park & Associates, PLC

(57) ABSTRACT

A display device includes a first substrate including a first surface and a second surface, a second substrate disposed on the second surface of the first substrate, a liquid crystal layer disposed between the first substrate and the second substrate, a color conversion layer disposed on the second substrate, and a third substrate disposed on the color conversion layer. The second surface of the first substrate is opposite the first surface of first substrate. The color conversion layer includes a magnetic anisotropy barrier wall.

20 Claims, 8 Drawing Sheets

(52) U.S. Cl.
CPC ............ *G02F 2001/133562* (2013.01); *G02F 2001/133614* (2013.01)

(56) References Cited

U.S. PATENT DOCUMENTS

| | | | |
|---|---|---|---|
| 2014/0160408 A1 | 6/2014 | Cho et al. | |
| 2015/0069430 A1* | 3/2015 | Collins | H01L 33/50 257/89 |
| 2015/0325278 A1* | 11/2015 | Bauer | H01L 43/08 365/158 |

FOREIGN PATENT DOCUMENTS

| | | |
|---|---|---|
| KR | 10-2012-0106317 | 9/2012 |
| KR | 10-2014-0074495 | 6/2014 |

OTHER PUBLICATIONS

Njo et al., "Light-Efficient Liquid Crystal Displays Using Photoluminescent Color Filters", SID Symposium Digest of Technical Papers, vol. 31(1), pp. 343-345, May 2000.

\* cited by examiner

DISPLAY DEVICE INCLUDING A PHOTOLUMINESCENT PANEL AND A MAGNETIC ANISOTROPY BARRIER WALL; AND METHOD OF MANUFACTURING THE DISPLAY DEVICE

CROSS-REFERENCE TO RELATED APPLICATION

This application claims priority from and the benefit of Korean Patent Application No. 10-2015-0079935, filed on Jun. 5, 2015, which is hereby incorporated by reference for all purposes as if fully set forth herein.

BACKGROUND

Field

Exemplary embodiments relate to a display device including a photo-luminescent panel that improves light emission efficiency. Exemplary embodiments also relate to a method of manufacturing the display device.

Discussion of the Background

Photo-luminescent liquid crystal display ("PL-LCD") devices are a type of liquid crystal display ("LCD") device that commonly include a fluorescence pattern and an ultraviolet ("UV") lamp in lieu of a color filter pattern and a fluorescent lamp used in conventional LCD devices. The PL-LCD device displays an image utilizing visible light that is generated when light is irradiated to a color conversion layer ("CCL"). The irradiated light has a relatively low wavelength range (such as UV light or blue light) and is emitted from a light source and controlled by a liquid crystal layer.

In a conventional LCD device, when light emitted from a backlight light source is transmitted through a red color filter R, a green color filter G, and a blue color filter B, the amount of light is decreased to a third of its original amount due to the respective color filters R, G, and B. In order to mitigate such an issue, the PL-LCD device employs a photo-excited member that may emit excited lights having different colors in lieu of the color filter.

However, when the excited light of the photo-excited member included in the color conversion layer is emitted through a substrate covering the color conversion layer or emitted in the air, a considerable amount of the excited light undergoes total internal reflection at boundary surfaces of layers forming the substrate or the like to be emitted downwards into the color conversion layer. Thus, about 10% of the light emitted from the backlight light source may be emitted externally. Therefore, the PL-LCD has diminished light emission efficiency compared to that of the conventional LCD device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a photo-luminescent panel that improves light emission efficiency as well as a method of manufacturing the display device.

Additional aspects will be set forth in the detailed description which follows, and, in part, will be apparent from the disclosure, or may be learned by practice of the inventive concept.

An exemplary embodiment discloses a display device that includes a first substrate including a first surface and a second surface, a second substrate disposed on the second surface of the first substrate, a liquid crystal layer disposed between the first substrate and the second substrate, a color conversion layer disposed on the second substrate, and a third substrate disposed on the color conversion layer. The second surface of the first substrate is opposite the first surface of first substrate. The color conversion layer includes a magnetic anisotropy barrier wall.

An exemplary embodiment also discloses a method of manufacturing a display device. The method includes forming a light blocking pattern having color regions spaced apart from one another on a substrate, forming a photo-excited pattern including a photo-excited member and a magnetic anisotropy barrier wall among the color regions, forming a planarization layer on the photo-excited pattern, and aligning the magnetic anisotropy barrier wall to be perpendicular to the substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
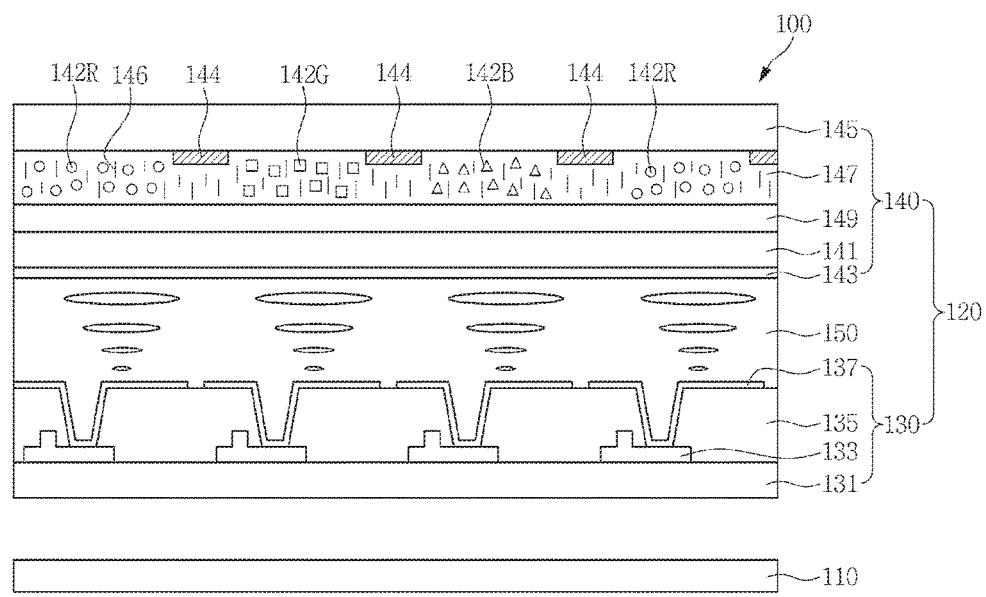
FIG. 1 is a cross-sectional view illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustratrates as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view illustrating a display device 100 according to an exemplary embodiment.

FIG. 1 illustrates the display device 100, which may be a photo-luminescent liquid crystal display ("PL-LCD") device. The display device 100 may include a backlight 110 and a display panel 120 configured to display an image based on light emitted from the backlight 110.

The backlight 110 may emit light having a predetermined wavelength, such as ultraviolet (UV) light or blue light, toward the display panel 120. Thus, the backlight 110 may include a light source configured to emit light.

According to an exemplary embodiment, the light source emits light having a wavelength in a range of about 200 nm to about 400 nm. The backlight 110 may further include a light guide plate (not illustrated) that guides the light emitted from the light source toward the display panel 120.

The display panel 120 may include an array substrate 130, an opposing substrate 140, and a liquid crystal layer 150 interposed between the array substrate 130 and the opposing substrate 140.

The array substrate 130 may include a first substrate 131, a switching element 133 on a pixel region of the first substrate 131, an insulating layer 135 through which a portion of an electrode of the switching element 133 is exposed, and a pixel electrode 137 disposed in a pixel region and electrically connected to an output electrode of the switching element 133 exposed through the insulating layer 135. The array substrate 130 may also include a gate line GL disposed on the first substrate 131 and extending in a first direction. The array substrate 130 may further include a data line DL disposed on the first substrate 131 and extending in a second direction intersecting the first direction.

The first substrate 131 may include a first surface and a second surface opposite the first surface. The backlight 110 may be disposed on the first surface of the first substrate 131.

The switching element 133 may include a thin film transistor ("TFT") that includes a source electrode, a drain electrode, and a gate electrode. The TFT may have a bottom-gate structure in which the gate electrode is disposed in a lower portion of the TFT and the source electrode and the drain electrode are disposed in an upper portion of the TFT.

In an alternative exemplary embodiment, the TFT may have a top-gate structure in which the source electrode and the drain electrode are disposed in the lower portion of the TFT and the gate electrode is disposed in the upper portion of the TFT.

The opposing substrate 140 may include a second substrate 141, a common electrode 143 on one surface of the second substrate 141, a third substrate 145 disposed on another surface of the second substrate 141 and opposing the second substrate 141, and a color conversion layer 147 interposed between the second substrate 141 and the third substrate 145.

The opposing substrate 140 may further include an optical filter layer 149 between the second substrate 141 and the color conversion layer 147. The opposing substrate 140 may further include a polarization film (not illustrated) between the second substrate 141 and the color conversion layer 147.

The second substrate 141 and the third substrate 145 may include or be formed of a transparent material, such as glass or plastic.

A photo-excited member 142 may absorb light having a predetermined wavelength range to be in an excited state. The photo-excited member 142 may emit the absorbed photo-energy when returning to aground state. The photo-excited member 142 may include a fluorescent member (hereinafter, "phosphor") or a quantum dot QD. The photo-excited member 142 may be a photo-excited member 142G that emits green light, a photo-excited member 142R that emits red light, or a photo-excited member 142B that emits yellow light. In other words, the photo-excited member 142 may include at least two materials selected from the group consisting of a green phosphor, a red phosphor, and a yellow phosphor. The photo-excited member 142 may include at least two materials selected from the group consisting of a green quantum dot, a red quantum dot, and a blue quantum dot.

A photo-excited member 142 may include at least one of oxynitride, nitride, silicate, aluminate, scandate, and oxyfluoride.

When the photo-excited member 142 is a phosphor, the photo-excited member 142 may be distributed within the color conversion layer 147 at a concentration range of about 3 g/cm$^3$ to about 4 g/cm$^3$. Further, the photo-excited member 142 may have a particle size in a range of about 5 μm to about 20 μm.

When one of the photo-excited members 142G includes at least one of β-SiAlON (Si6-zALzOzN8-z), (Ba,Sr)2SiO4: Eu, and CaSc20:Ce, the photo-excited member 142G may emit excited light having a green wavelength range. When α-SiAlON is used as the phosphor, the photo-excited member 142 may be distributed within the color conversion layer 147 at a concentration of about 3.2 g/cm$^3$.

When one of the photo-excited members 142R includes at least one of CaAlSiN3:Eu, (Sr,Ca)AlSiN3:Eu, and CaAlSi (ON)3:Eu, the photo-excited member 142R, may emit excited light having a red wavelength range.

When one of the photo-excited members 142B includes at least one of Y3Al5O12:Ce and Tb3Al5O12:Ce, the photo-excited member 142B may emit excited light having a yellow wavelength range.

When blue light is irradiated from the backlight 110 and the photo-excited member 142B includes at least one of Y3Al5O12:Ce and Tb3Al5O12:Ce, the excited light emitted from the photo-excited member 142B and the blue light are mixed, such that white light may be emitted.

When the photo-excited member 142 is a quantum dot QD, the photo-excited member 142 may include at least one of cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), gallium nitride (GaN), gallium phosphide (GaP), gallium arsenide (GaAs), indium phosphide (InP), and indium arsenide (InAs). However, the material forming the photo-excited member 142 is not limited to such elements. The photo-excited member 142 may include other elements. Further, photo-excited member 142 may be used in combination of two or more types.

When the photo-excited member 142 has an average particle diameter in a range of about 2 nm to about 10 nm, the photo-excited member 142 may function as a quantum dot, and may be distributed uniformly within a photosensitive resin composition.

In addition, the photo-excited member 142 may have a core-shell structure and may have gradient in composition. For example, the photo-excited member 142 may have a core-shell structure including a core and a shell covering the core.

The core may include at least one of cadmium selenide (CdSe), cadmium sulfide (CdS), cadmium telluride (CdTe), zinc sulfide (ZnS), zinc selenide (ZnSe), zinc telluride (ZnTe), cadmium selenium telluride (CdSeTe), cadmium zinc sulfide (CdZnS), cadmium selenium sulfide (CdSeS), lead selenide (PbSe), lead sulfide (PbS), lead telluride (PbTe), silver indium zinc sulfide (AgInZnS), mercury sulfide (HgS), mercury selenide (HgSe), mercury telluride (HgTe), gallium nitride (GaN), gallium phosphide (GaP), gallium arsenide (GaAs), indium phosphide (InP), indium zinc phosphide (InZnP), indium gallium phosphide (InGaP), indium gallium nitride (InGaN), indium arsenide (InAs), and zinc oxide (ZnO). However, the material forming the core is not limited to these elements and may include any suitable element.

The shell may include at least one of cadmium sulfide (CdS), cadmium selenide (CdSe), cadmium telluride (CdTe), cadmium oxide (CdO), zinc sulfide (ZnS), zinc selenide (ZnSe), zinc telluride (ZnTe), zinc oxide (ZnO), indium phosphide (InP), indium sulfide (InS), gallium phosphide (GaP), gallium nitride (GaN), gallium oxide (GaO), indium zinc phosphide (InZnP), indium gallium phosphide (InGaP), indium gallium nitride (InGaN), indium zinc sulfide cadmium selenide (InZnSCdSe), lead sulfide (PbS), titanium oxide (TiO), strontium selenide (SrSe), and mercury selenide (HgSe). However, the material forming the shell is not limited to these elements and may include any suitable element.

The photo-excited member 142 having the core-shell structure may have a core with average particle diameter in a range of about 2 nm to about 5 nm. In addition, the photo-excited member 142 may have a shell with an average thickness in a range of about 2 nm to about 5 nm. When the core and shell have an average particle diameter and average thickness in the above range, the photo-excited member 142 may function as a phosphor, and may be distributed uniformly within the photosensitive resin composition.

The photo-excited member 142 may be distributed within the color conversion layer 147 at a concentration in a range of about 4 g/cm$^3$ to about 5 g/cm$^3$. Further, the photo-excited member 142 may have a particle size in a range of about 10 nm or less.

When the photo-excited member 142 includes quantum dot QD, the wavelength range of the excited light may vary based on the size of the quantum dot QD. More specifically, the excited light of the quantum dot QD may be one of a red light, a green light, and a blue light, based on the size of the quantum dots QD.

When CdSe/ZnS is used as the quantum dot QD, the quantum dot QD may be distributed within the color conversion layer 147 at a concentration of about 4.43 g/cm$^3$.

The light blocking member 144 may include a material having a high dielectric constant any may be disposed corresponding to an outer circumferential portion of a pixel region to block light.

According to an exemplary embodiment, the light blocking member 144 is disposed on a surface of the third substrate 145. However, the position of the light blocking member 144 is not limited to a surface of the third substrate 145. In an alternative exemplary embodiment, the light blocking member 144 may be disposed on at least one of the first substrate 131, the second substrate 141, and the third substrate 145.

The light blocking member 144 may be disposed to overlap the gate line GL and the data line DL. The light blocking member 144 may include at least one of a metal and an organic material. The organic material may have high optical density.

According to an exemplary embodiment, the light blocking member 144 includes chromium (Cr).

A magnetic anisotropy barrier wall 146 may be formed within the color conversion layer 147. The magnetic anisotropy barrier wall 146 may be formed at a concentration range of about 1% to about 30% of the volume of the resin layer. However, the magnetic anisotropy barrier wall 146 may be formed at any suitable concentration.

According to an exemplary embodiment, the magnetic anisotropy barrier wall 146 may include at least one of alnico (63% Fe, 12% Al, 20% Ni, 5% Co), barium ferrite (BaO, $6Fe_2O_3$), vicalloy (38% Fe, 52% Co, and 10% V), and manganese aluminum (70% Mn, 29% Al, and 1% C). Exemplary embodiments are not limited to the listed magnetic anisotropy materials and may exemplary include any suitable magnetic anisotropy material According to an exemplary embodiment, the magnetic anisotropy barrier wall 146 may be disposed perpendicular to a surface (e.g., the upper surface) of the second substrate 141. The magnetic anisotropy barrier wall 146 may be disposed substantially perpendicular to a surface of the second substrate 141. The photo-excited members 142 and the magnetic anisotropy barrier walls 146 may be uniformly distributed within the color conversion layer 147. The photo-excited members 142 and the magnetic anisotropy barrier walls 146 may be distributed such that they are substantially uniform within the color conversion layer 147.

Figure 2:
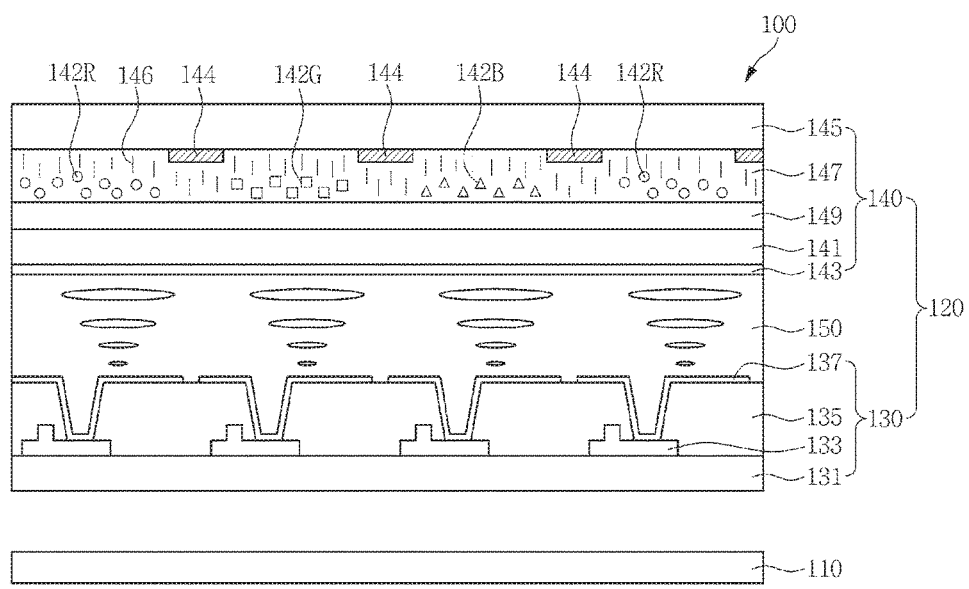
FIG. 2 is a cross-sectional view illustrating a display device according to an exemplary embodiment.

As shown in FIG. 2, the photo-excited member 142 may be disposed in a lower portion of the color conversion layer 147 compared to the magnetic anisotropy barrier wall 146. In other words, the magnetic anisotropy barrier wall 146 may be disposed in the upper portion of the color conversion layer 147 compared to the photo-excited member 142.

Figure 3:
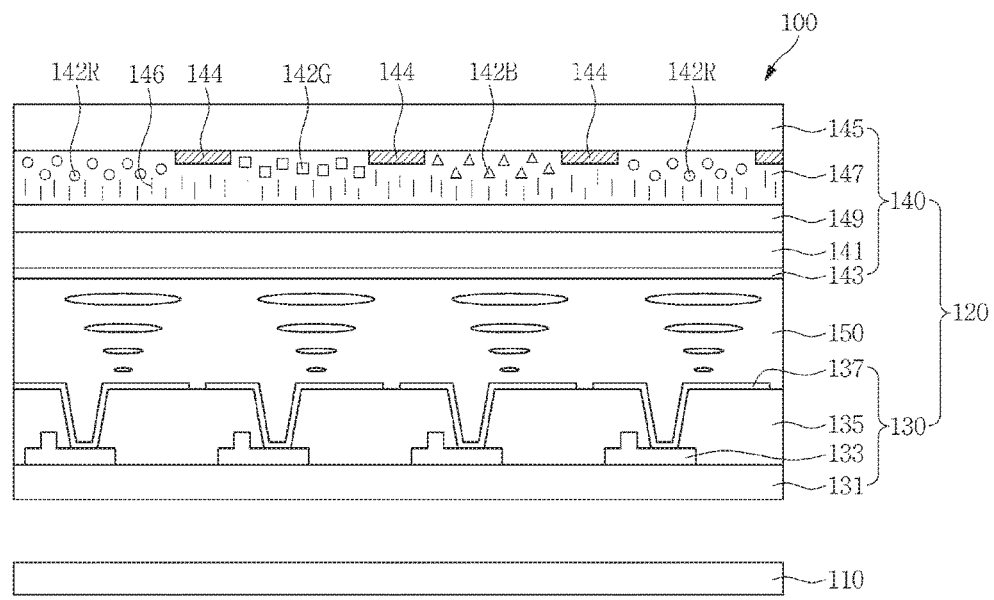
FIG. 3 is a cross-sectional view illustrating a display device according to an exemplary embodiment.

As shown in FIG. 3, the photo-excited member 142 may be disposed in an upper portion of the color conversion layer 147 compared to the magnetic anisotropy barrier wall 146. In other words, the magnetic anisotropy barrier wall 146 may be disposed in the lower portion of the color conversion layer 147 compared to the photo-excited member 142.

The common electrode 143 may include a transparent conductive material and may receive a common voltage.

The color conversion layer 147 may include the photo-excited member 142 and the magnetic anisotropy barrier wall 146. The photo-excited members 142 and the magnetic anisotropy barrier walls 146 may be disposed within a resin layer of the color conversion layer 147.

The resin layer of the color conversion layer 147 may include or be formed of at least one of silicon resin and a photoresist PR resin.

In addition, the color conversion layer 147 may include a scattering member. The scattering member may scatter the excited light emitted from the photo-excited member 142. The scattering member may include at least one of titanium oxide and silicon oxide. The scattering member may have a particle size of about 1 μm or less.

An optical filter layer 149 may include an optical clean adhesive (OCA) film and/or an optical air layer.

The optical filter layer 149 may upwardly reflect a fraction of the excited light that is reflected from the magnetic anisotropy barrier wall 146 downwardly to the liquid crystal layer 150. In other words, the optical filter layer 149 may reflect a faction of the excited light from the magnetic anisotropy barrier wall 146 in an opposite direction.

Figure 4:
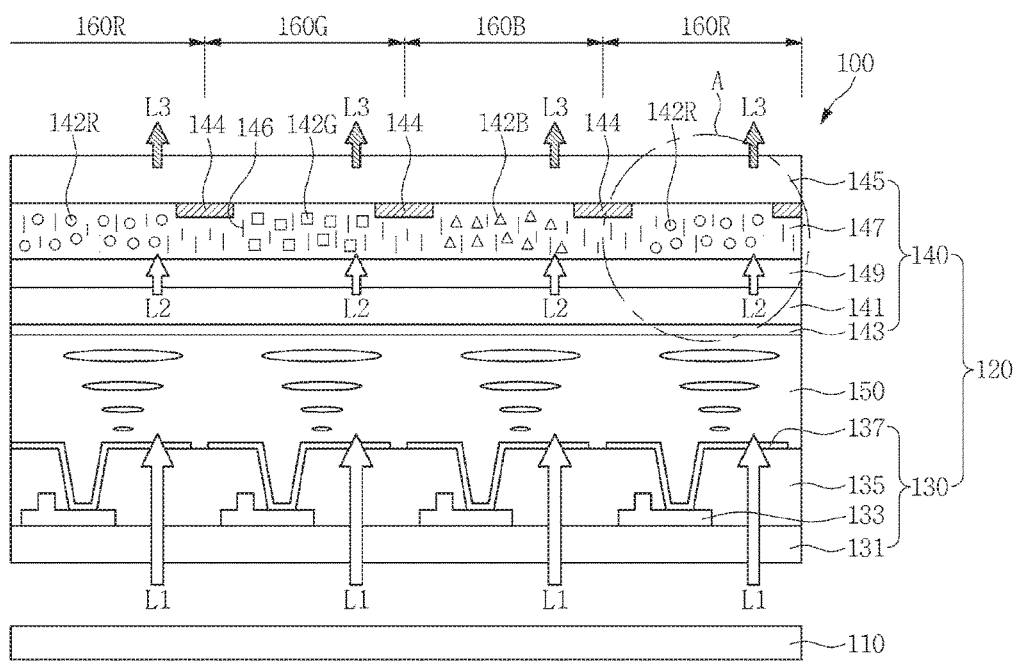
FIG. 4 is across-sectional view illustrating a display device with visible lights having different wavelength ranges according to an exemplary embodiment.

FIG. 4 is a cross-sectional view illustrating a display device with visible lights having different wavelength ranges according to an exemplary embodiment.

As shown in FIG. 4, a first light L1 emitted from the backlight 110 may be transmitted through the array substrate 130 to reach the liquid crystal layer 150. Orientation of the liquid crystals included in the liquid crystal layer 150 may vary based on a voltage applied to the pixel electrode 137 and the common electrode 143. An amount of the first light L1 transmitted through the liquid crystal layer 150 may be adjusted by the orientation of the varied orientation of the liquid crystals. A second light L2, which is a light adjusted in terms of the light amount by the liquid crystal layer 150, may reach the color conversion layer 147. The photo-excited member 142 included in the color conversion layer 147 absorbs at least a fraction of the second light L2 to be excited. Excited light is emitted when the excited photo-excited member 142 returns to the ground state.

One of the photo-excited member 142 (e.g., a photo-excited member 142R) included in a first color region 160R of the color conversion layer 147 may emit excited light having a red wavelength range.

One of the photo-excited member 142 (e.g., a photo-excited member 142G) included in a second color region 160G of the color conversion layer 147 may emit excited light having a green wavelength range.

One of the photo-excited member 142 (e.g., a photo-excited member 142B) included in a third color region 160B of the color conversion layer 147 may emit excited light having a blue wavelength range.

The photo-excited member 142B included in the third color region 160B of the color conversion layer 147 may emit excited light having a blue wavelength range.

In addition, in a case where the first light L1 is blue light, the excited light of the photo-excited member 142B included in the third color region 160B of the color conversion layer 147 may be combined with the first light, and thereby white light may be emitted from the third color region 160B.

Although the photo-excited member 142B is illustrated as being included in the third color region 160B in FIG. 4, the photo-excited member 142B may be absent in the third color region 160B of the color conversion layer 147 when the first light L1 is blue light. Thus, luminance of the blue light emitted from the third color region 160B may be controlled only by controlling the liquid crystal layer 150 corresponding to the third color region 160B.

Figure 5:
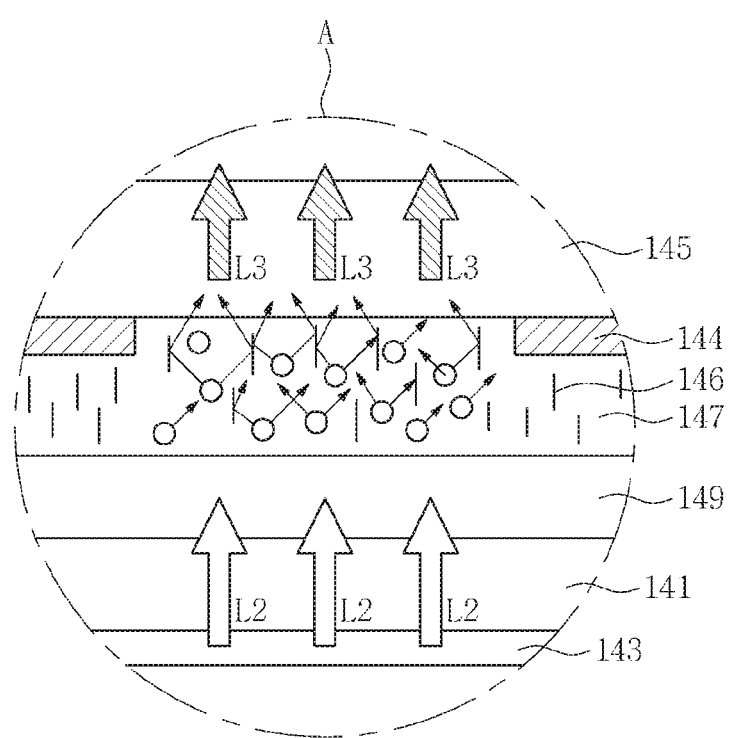
FIG. 5 is a cross-sectional view illustrating an enlarged portion A of FIG. 4.

FIG. 5 is a cross-sectional view illustrating an enlarged portion A of FIG. 4.

The light blocking member 144 has a predetermined thickness D (not shown) and width within the color conversion layer 147. The light blocking member 144 may have an upper-surface width UW and a lower-surface width LW that are substantially the same width.

Hereinafter, a light emission process will be described, in which the second light L2 is converted into visible light having a predetermined color (i.e., a third light L3). The second light L2 may transmitted through the color conversion layer 147, converted into a third light L3 of a predetermined color, and emitted through an upper boundary surface of the color conversion layer 147.

More specifically, the second light L2 transmitted through the liquid crystal layer 150 reaches the color conversion layer 147. A fraction of the second light L2 reaching the color conversion layer 147 may be absorbed by the photo-excited member 142 to be emitted as the excited light. Another fraction of the second light L2 that is not absorbed by the photo-excited member 142 may transmit the color conversion layer 147 as it is. Another fraction of the excited light emitted from the photo-excited member 142 may be reflected by the magnetic anisotropy barrier wall 146.

The third light L3 emitted from the color conversion layer 147 may include a fraction of the excited light directly emitted from the photo-excited member 142 and a fraction of the excited light reflected upwardly by the magnetic anisotropy barrier wall 146. In addition, the third light L3 emitted from the color conversion layer 147 may include a fraction of the excited light emitted from the photo-excited member 142, reflected by one of the magnetic anisotropy barrier walls 146, and re-reflected upwardly by another of the magnetic anisotropy barrier walls 146. Thus, the third light L3 may include the entire fraction of light reflected by the magnetic anisotropy barrier walls 146 and emitted upwardly (i.e., away form the backlight 110).

When the optical filter layer 149 is disposed between the color conversion layer 147 and the second substrate 141, the excited light emitted downwards (i.e., towards the backlight 110) by the photo-excited member 142 and excited light emitted downwards by the magnetic anisotropy barrier walls 146 may be reflected off a lower boundary surface of the optical filter layer 149 and the color conversion layer 147 to propagate upwards (i.e., away from the backlight 110).

In addition, the excited light propagating upwards may be reflected again by the magnetic anisotropy barrier walls 146 to be emitted externally through the upper boundary surface of the color conversion layer 147.

Thus, light having a predetermined wavelength (e.g., the second light L2) is transmitted through the liquid crystal layer 150 and, converted to visible light having a predetermined color (e.g., the third light L3) by the color conversion layer 147. The converted visible light is reflected by the magnetic anisotropy barrier walls 146 to be emitted upwards. Accordingly, the light emission efficiency of the color conversion layer 147 may be enhanced by the above described exemplary embodiments.

Figure 6A:
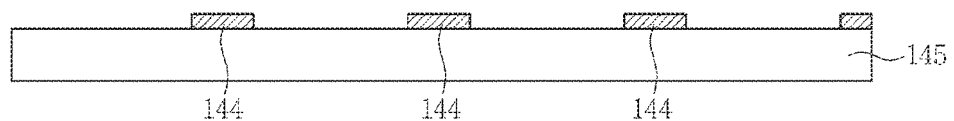
FIGS. 6A, 6B, 6C, 6D, 6E, 6F, and 6G are cross-sectional views illustrating a method of manufacturing an opposing substrate of a display panel according to an exemplary embodiment.

FIGS. 6A, 6B, 6C, 6D, 6E, 6F, and 6G are cross-sectional views illustrating a method of manufacturing the opposing substrate 140 of the display panel 120 according to an exemplary embodiment, Referring to FIG. 6A, a chromium (Cr) layer is formed on a surface of the third substrate 145, and a photoresist PR is disposed on the chromium (Cr) layer. Subsequently, the photoresist PR is selectively exposed to light and developed using a predetermined mask so as to form the light blocking member 144 in a predetermined position.

The light blocking member 144 may be arranged on the third substrate 145 in a lattice form corresponding to the gate line GL and the data line DL that are to be formed on the array substrate 130 (shown in FIGS. 1-4).

Figure 6B:
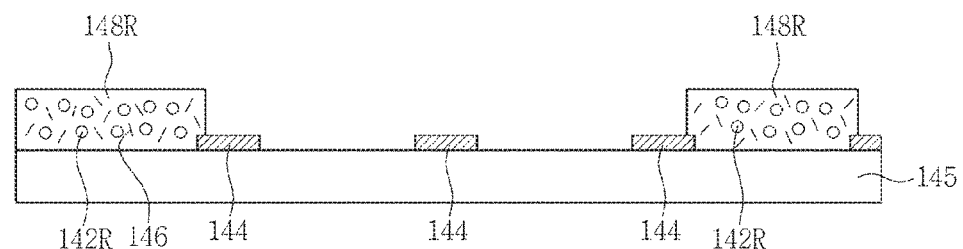

Referring to FIG. 6B, a first photo-excited pattern 148R may be formed or the third substrate 145. The first photo-excited pattern 148R may include a resin layer, photo-excited members 142R emitting excited color having the first color, and the magnetic anisotropy barrier walls 146 may be distributed in the resin layer of the first photo-excited pattern 148R. The light blocking member 144 may formed on the third substrate 145 in the first color region 160R. More particularly, the resin layer of the first photo-excited pattern 148R may be selectively exposed to light and developed. The first photo-excited pattern 148R may be formed in the first color region 160R (FIG. 4).

Figure 6C:
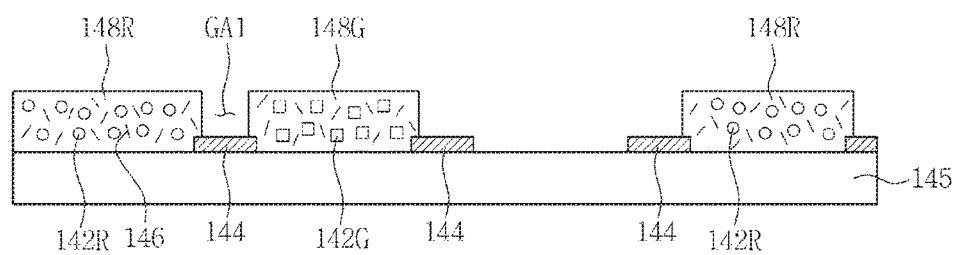

Referring to FIG. 6C, a second photo-excited pattern 148G may be formed on the third substrate 145 in the second color region 160G. The second photo-excited pattern 148G may include a resin layer as well as the photo-excited members 142G emitting the excited light having the second color and the magnetic anisotropy barrier walls 146 distributed in the resin layer. More particularly, the resin layer of the second photo-excited pattern 148G may be disposed on the third substrate 145. The resin layer of the second photo-excited pattern 148G may be selectively exposed to light and developed. The second photo-excited pattern 148G may be formed in the second color region 160G (FIG. 4).

A first gap GA1 is defined between the second photo-excited pattern 148G and the first photo-excited pattern 148R. The first gap GA1 may be positioned corresponding to the light blocking member 144 between the first photo-excited pattern 148R and the second photo-excited pattern 148G.

Figure 6D:
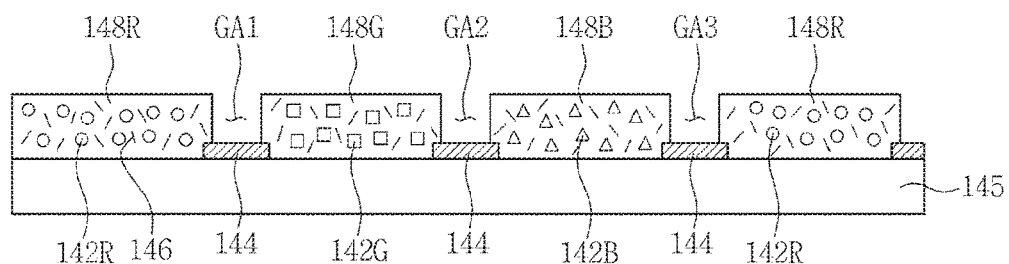

Referring to FIG. 6D, a third photo-excited pattern 148B may be formed on the third substrate 145. The third photo-excited pattern 148B may include a resin layer as well as photo-excited members 142B emitting excited color having the third color and the magnetic anisotropy barrier walls 146 distributed within the resign layer.

More particularly, the resin layer of the third photo-excited pattern 148B may be selectively exposed to light and developed. The third photo-excited pattern 148B may be formed in the third color region 160B (FIG. 4).

A second gap GA2 is defined between the third photo-excited pattern 148B and the second photo-excited pattern 148G. The second gap GA2 may be positioned corresponding to the light blocking member 144 between the second photo-excited pattern 148G and the third photo-excited pattern 148B.

Similarly, a third gap GA3 is defined between the third photo-excited pattern 148B and the first photo-excited pattern 148R. The third gap GA3 may be positioned corresponding to the light blocking member 144 between the third photo-excited pattern 148B and the first photo-excited pattern 148R.

Referring to FIGS. 6B, 6C, and 6D, although the process of forming the photo-excited patterns 148R, 148G, and 148B and the magnetic anisotropy barrier walls 146 in the order of red R, green G, and blue B is described, the sequence of forming the photo-excited patterns 148R, 148G, and 148B may be different. Further, in FIGS. 6B, 6C, and 6D, although the process of sequentially forming the first photo-excited pattern 148R including the photo-excited member 142R emitting the excited light having the first color, the second photo-excited pattern 148G including the photo-excited member 142G emitting the excited light having the second color, and the third photo-excited pattern 148B including the photo-excited member 142B emitting the excited light having the third color is described, the resin pattern absent the photo-excited members 142R, 142G, and 142B may be formed first, and the photo-excited members 142R, 142G, and 142B may be distributed subsequently within the formed resin pattern corresponding to the respective color regions 160R, 160G, and 160B to form the photo-excited patterns 148R, 148G, and 148B.

Figure 6E:
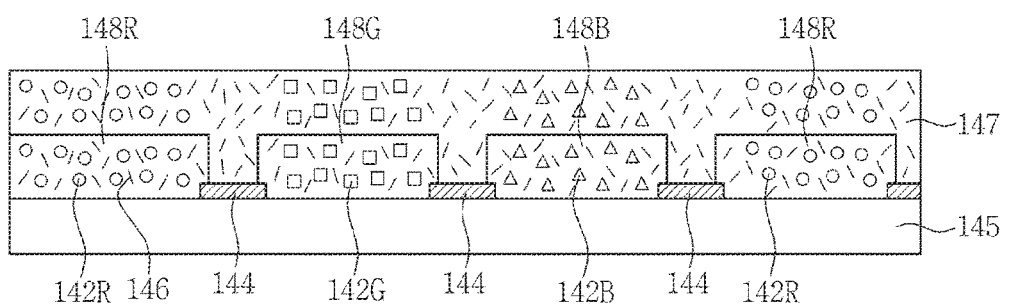

Referring to FIG. 6E, a planarization layer may be formed on the third substrate 145. The planarization layer may include the photo-excited member 142 and the magnetic anisotropy barrier wall 146. The planarization layer may be formed of a material the same as that forming the photo-excited patterns 148.

Figure 6F:
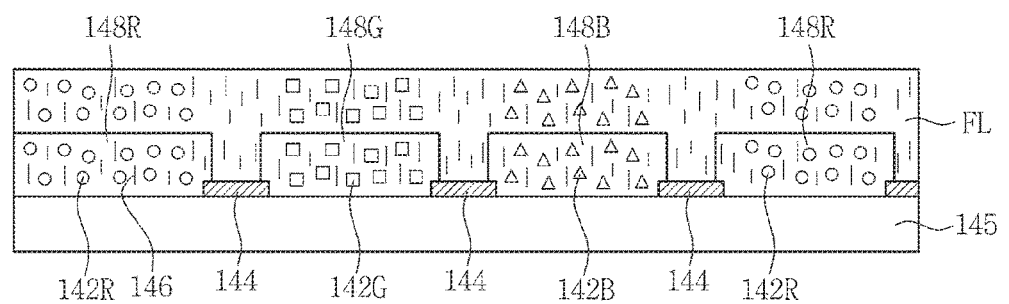

Referring to FIG. 6F, an electrical field is applied to an upper portion and a lower portion of the third substrate 145 to align the magnetic anisotropy barrier wall 146 of the planarization layer and the photo-excited patterns 148 in a direction perpendicular to the third substrate 145.

In this case, an electromagnet, a magnet, or the like may be used to apply the electrical field. However, exemplary embodiments may include the use of any suitable device to apply an electrical field and are not limited to using an electromagnet or magnet.

The planarization layer and the photo-excited pattern 148 may be cured to form the color conversion layer 147 that maintains the alignment of the magnetic anisotropy barrier wall 146.

Figure 6G:
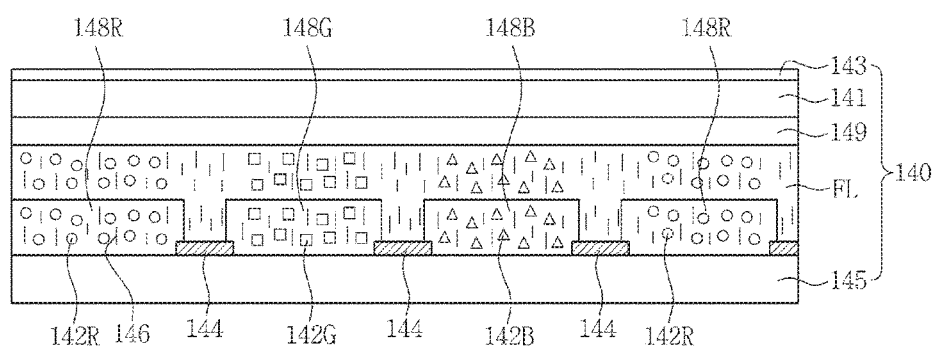

Referring to FIG. 6G, the third substrate 145, on which the planarization layer is formed, maybe coupled to a surface of the second substrate 141 opposite the common electrode 143. In other words, the third substrate 145 may be coupled (directly or indirectly) to a first surface of the second substrate 141. The common electrode 143 may be coupled (directly or indirectly) to a second surface of the second substrate 141. The first and second surface of the second substrate 141 maybe opposite to one another.

In alternative exemplary embodiments, the second substrate 141 and the third substrate 145 may be coupled (directly or indirectly) to each other while having a polarizing film, an optical film, or an OCA film (e.g., an optical filter layer 149) between the second substrate 141 and the third substrate 145.

As set forth above, according to exemplary embodiments, the excited light emitted from the photo-excited member is reflected by the magnetic anisotropy barrier wall included in the color conversion layer, thereby enhancing light emission efficiency.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a first substrate comprising a first surface and a second surface;
a second substrate disposed on the second surface of the first substrate;
a liquid crystal layer disposed between the first substrate and the second substrate;
a color conversion layer disposed on the second substrate; and
a third substrate disposed on the color conversion layer,
wherein the second surface of the first substrate is opposite the first surface of first substrate and the color conversion layer comprises a magnetic anisotropy barrier wall.

2. The display device of claim 1, wherein the magnetic anisotropy barrier wall comprises at least one of alnico, barium ferrite, vicalloy, and manganese aluminum.

3. The display device of claim 1, wherein the magnetic anisotropy barrier wall is aligned perpendicular to a surface of the second substrate.

4. The display device of claim 3, wherein the color conversion layer further comprises a photo-excited member.

5. The display device of claim 4, wherein the photo-excited member is disposed in a lower portion of the color conversion layer compared to the magnetic anisotropy barrier wall.

6. The display device of claim 4, wherein the photo-excited member is disposed in an upper portion of the color conversion layer compared to the magnetic anisotropy barrier wall.

7. The display device of claim 4, wherein the photo-excited members and the magnetic anisotropy barrier walls are uniformly distributed in the color conversion layer.

8. The display device of claim 4, further comprising a light blocking member on one of the first substrate, the second substrate, and the third substrate.

9. The display device of claim 8, wherein the photo-excited member comprises at least two materials selected from the group consisting of a green phosphor, a red phosphor, and a yellow phosphor.

10. The display device of claim 8, wherein the photo-excited member comprises at least two materials selected from the group consisting of a green quanutm dot, a red quanutm dot, and a blue quanutm dot.

11. The display device of claim 10, wherein the photo-excited member comprises at least one one of cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), gallium nitride (GaN), gallium phosphide (GaP), gallium arsenide (GaAs), indium phosphide (InP), and indium arsenide (InAs).

12. The display device of claim 10, wherein the photo-excited member has a core-shell structure comprising a shell covering a core,
wherein the core comprises at least one of cadmium selenide (CdSe), cadmium sulfide (CdS), cadmium telluride (CdTe), zinc sulfide (ZnS), zinc selenide (ZnSe), zinc telluride (ZnTe), cadmium selenium telluride (CdSeTe), cadmium zinc sulfide (CdZnS), cadmium selenium sulfide (CdSeS), lead selenide (PbSe), lead sulfide (PbS), lead telluride (PbTe), silver indium zinc sulfide (AgInZnS), mercury sulfide (HgS), mercury selenide (HgSe), mercury telluride (HgTe), gallium nitride (GaN), gallium phosphide (GaP), gallium arsenide (GaAs), indium phosphide (InP), indium zinc phosphide (InZnP), indium gallium phosphide (InGaP), indium gallium nitride (InGaN), indium arsenide (InAs), and zinc oxide (ZnO), and
the shell comprises at least one of cadmium sulfide (CdS), cadmium selenide (CdSe), cadmium telluride (CdTe), cadmium oxide (CdO), zinc sulfide (ZnS), zinc selenide (ZnSe), zinc telluride (ZnTe), zinc oxide (ZnO), indium phosphide (InP), indium sulfide (InS), gallium phosphide (GaP), gallium nitride (GaN), gallium oxide (GaO), indium zinc phosphide (InZnP), indium gallium phosphide (InGaP), indium gallium nitride (InGaN), indium zinc sulfide cadmium selenide (InZnSCdSe), lead sulfide (PbS), titanium oxide (TiO), strontium selenide (SrSe), and mercury selenide (HgSe).

13. The display device of claim 8, further comprising an optical filter layer disposed between the color conversion layer and the second substrate.

14. The display device of claim 13, further comprising a backlight disposed on the first surface of the first substrate.

15. The display device of claim 14, wherein the color conversion layer further comprises a light scattering member.

16. A method of manufacturing a display device, the method comprising:
   forming a light blocking pattern having color regions spaced apart from one another on a substrate;
   forming a photo-excited pattern comprising a photo-excited member and a magnetic anisotropy barrier wall among the color regions;
   forming a planarization layer on the photo-excited pattern; and
   aligning the magnetic anisotropy barrier wall to be perpendicular to the substrate.

17. The method of claim 16, further comprising forming an optical filter layer on the planarization layer.

18. The method of claim 16, wherein the magnetic anisotropy barrier wall comprises at least one of alnico, barium ferrite, vicalloy, and manganese aluminum.

19. The method of claim 16, wherein forming the photo-excited pattern comprises forming the photo-excited member in a lower portion of the photo-excited pattern compared to the magnetic anisotropy barrier wall.

20. The method of claim 16, wherein forming the photo-excited pattern comprises forming the photo-excited member in an upper portion of the photo-excited pattern compared to the magnetic anisotropy barrier wall.

* * * * *